United States Patent
Green (10) Patent No.: US 7,493,199 B2
(45) Date of Patent: Feb. 17, 2009

(54) METHOD OF CONTROLLING A ROLL CONTROL SYSTEM FOR IMPROVED VEHICLE DYNAMIC CONTROL

(75) Inventor: Stephen J. Green, Clarkston, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 55 days.

(21) Appl. No.: 11/582,232

(22) Filed: Oct. 17, 2006

(65) Prior Publication Data

US 2008/0091317 A1    Apr. 17, 2008

(51) Int. Cl.
B60G 17/00    (2006.01)

(52) U.S. Cl. .................... 701/38; 280/5.504

(58) Field of Classification Search ............ None
See application file for complete search history.

(56) References Cited

U.S. PATENT DOCUMENTS

| | | | |
|---|---|---|---|
| 4,805,929 A | | 2/1989 | Shibata et al. |
| 4,973,077 A | | 11/1990 | Kuwayama et al. |
| 5,066,041 A | * | 11/1991 | Kindermann et al. .... 280/5.506 |
| 5,265,913 A | | 11/1993 | Scheffel |
| 5,630,623 A | | 5/1997 | Ganzel |
| 5,749,596 A | * | 5/1998 | Jensen et al. .......... 280/124.166 |
| 6,457,730 B1 | * | 10/2002 | Urbach ................ 280/124.161 |
| 6,471,218 B1 | * | 10/2002 | Burdock et al. .......... 280/5.502 |
| 2005/0082781 A1 | * | 4/2005 | Germain et al. ....... 280/124.106 |
| 2005/0179219 A1 | * | 8/2005 | Barron .................... 280/5.506 |
| 2005/0253350 A1 | * | 11/2005 | Suchta et al. ......... 280/124.106 |

OTHER PUBLICATIONS

Abstract: WO 2005/120190 A3; published Dec. 22, 2005; Hollowell et al.*

* cited by examiner

*Primary Examiner*—Michael J. Zanelli
(74) *Attorney, Agent, or Firm*—MacMillan, Sobanski & Todd, LLC (57) ABSTRACT

A method of controlling a roll control system includes monitoring the position of a steering mechanism of a vehicle. A rate of change of the position of the steering mechanism is determined. The rate of change is compared to a change threshold value. The lateral acceleration of a vehicle is monitored. The lateral acceleration is compared to an acceleration threshold value. A roll control system having at least one of a front and a rear actuator is controlled based at least in part upon the comparisons of the rate of change of the steering mechanism to the change threshold value and the lateral acceleration to the acceleration threshold value. The front and rear actuators are controlled independently of each other depending upon the state of a vehicle stability index.

14 Claims, 7 Drawing Sheets

METHOD OF CONTROLLING A ROLL CONTROL SYSTEM FOR IMPROVED VEHICLE DYNAMIC CONTROL

BACKGROUND OF THE INVENTION

This invention relates in general to methods and systems for controlling the dynamics of a vehicle.

Generally, vehicles include a variety of base systems, such as, for example, engine/powertrain, brake, steering, suspension, etc. Most vehicles include advanced vehicle stability control systems that control one or more components of the base systems to perform auxiliary functions. These advanced vehicle stability control systems may include, for example, antilock braking systems (ABS), slip control systems (SCS), traction control (TC), roll control (RC), vehicle stability control (VSC), enhanced stability control (ESC), advanced suspension control (SUSP).

Typically, these advanced systems are controlled by a programmed electronic control unit (ECU). The electronic control unit utilizes information from various vehicle sensors that measure dynamic characteristics of the movement of a vehicle, such as acceleration, yaw rate, pitch rate, roll rate, steering angle, vehicle braking action, vehicle drive train operation, and the like, to control operation of various components of the vehicle, for example, to improve handling or safety. Examples of components that may be controlled by one of the advanced systems are suspension actuators, engine/powertrain transmission, steering actuators, vehicle brakes and other like or known similar components.

SUMMARY OF THE INVENTION

This invention relates to a method of controlling a roll control system for improved vehicle dynamic control.

A method of controlling a roll control system includes monitoring the position of a steering mechanism of a vehicle. A rate of change of the position of the steering mechanism is determined. The rate of change is compared to a change threshold value. The lateral acceleration of a vehicle is monitored. The lateral acceleration is compared to an acceleration threshold value. A roll control system having at least one of a front and a rear actuator is controlled based at least in part upon the comparisons of the rate of change of the steering mechanism to the change threshold value and the lateral acceleration to the acceleration threshold value. The front and rear actuators are controlled independently of each other depending upon the state of a vehicle stability index.

Various objects and advantages of this invention will become apparent to those skilled in the art from the following detailed description of the preferred embodiment, when read in light of the accompanying drawings.

DETAILED DESCRIPTION OF THE PREFERRED EMBODIMENTS

Figure 1:
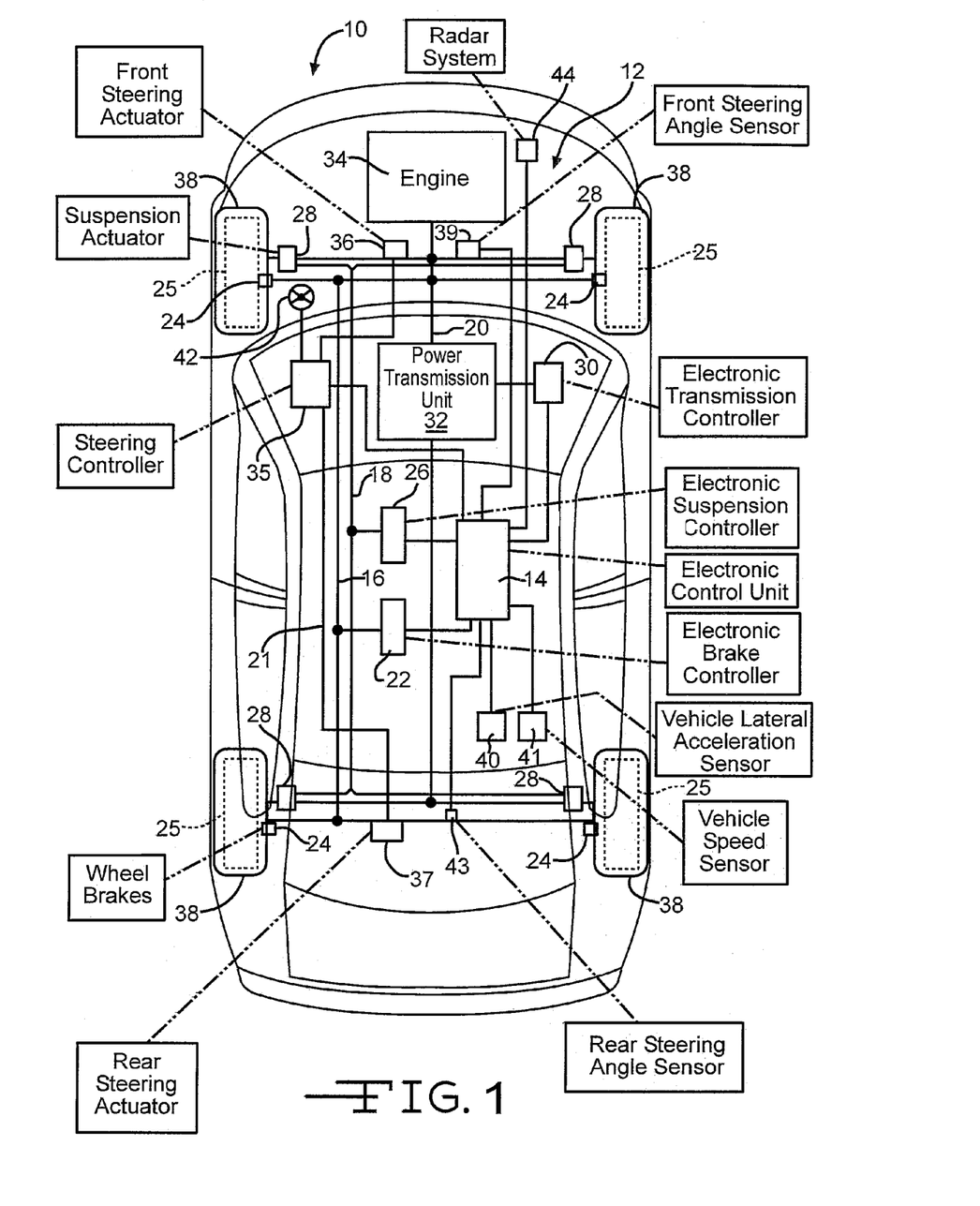
FIG. 1 is a schematic diagram of an embodiment of a vehicle having a roll control system.

Referring now to the drawings, there is illustrated in FIG. 1 a vehicle, indicated generally at 10, having a vehicle control system, indicated generally at 12. The vehicle control system 12 includes an electronic control unit 14 (ECU). The vehicle control system 12 also includes a plurality of vehicle control subsystems. The plurality of vehicle control subsystems includes components of the vehicle 10 that affect the operation of the vehicle 10. In the illustrated embodiment, the electronic control unit 14 of the vehicle control system 12 is operative to generate one or more output signals to one or more vehicle control subsystems in order to cause the vehicle control subsystem(s) to act to improve vehicle stability and/or performance.

As shown in the embodiment illustrated in FIG. 1 the plurality of vehicle control subsystems may include a vehicle braking system 16, a vehicle suspension system 18, a vehicle powertrain system 20, and a vehicle steering system 21. It must be understood, however, that the plurality of vehicle control subsystems need not include any particular vehicle system and indeed may be any suitable vehicle system or systems for controlling the operation of a vehicle, such as the vehicle 10. The particular vehicle systems to be included in the plurality of vehicle control subsystems may, for example, be chosen based upon the application of a particular vehicle in which the vehicle control system 12 is to be included. Alternatively, the particular arrangement(s) and/or type(s) of vehicle control subsystems may be other than illustrated and described, if so desired.

In the illustrated embodiment, the vehicle braking system 16 includes an electronic brake controller 22 and a plurality of wheel brakes 24 for braking associated wheels 25 of the vehicle 10. A respective tire 38 is mounted upon each wheel 25. The vehicle braking system 16 may be a hydraulic/pneumatic braking system with fluid pressure actuated wheel brakes. The vehicle braking system 16 may be an electromechanical braking system, such as brake-by-wire, with electric driven wheel brakes. Alternatively, the particular vehicle braking system may be other than illustrated and desired, and may be any system operable to provide vehicle braking as so desired.

In the illustrated embodiment, upon receipt of a signal or an activation command from the electronic control unit 14, such as initiated by depression of a brake pedal or instruction from another vehicle subsystem, the electronic brake controller 22 actuates the wheel brakes 24. This may be accomplished by supplying electric current, in the case of electric wheel brakes, or fluid pressure, in the case of hydraulic or pneumatic brakes, or in any other suitable manner as desired. It must be understood that the operation of the vehicle braking system 16 may be preformed in any suitable manner, including antilock braking, or alternatively in any manner desired that is operable to brake the vehicle 10.

In the illustrated embodiment, the vehicle suspension system 18 is operable to isolate portions of the vehicle 10 from loads imposed by irregularities in the terrain over which the vehicle 10 travels. The vehicle suspension system 18 is also operable to isolate portions of the vehicle 10 from loads imposed by movements of other portions of the vehicle 10. The vehicle suspension system 18 includes an electronic suspension controller 26 and a plurality of suspension actuators 28. The condition of at least one component of the vehicle suspension system 18 may be modified or selected so as to improve stability of the vehicle 10. For example, the condition, i.e., the lock/unlock state of the suspension actuators 28, may be selected to change the "stiffness" properties of an anti-roll bar (not shown) of the vehicle 10. Additionally, the condition of other suspension components (not shown) may be modified to improve the stability of the vehicle 10. For example, the condition, i.e., opened or closed flow state of control valves or other components (not shown) may be modified to change fluid flow characteristics in such components as hydraulic or pneumatic shock absorbers, or to vary the fluid pressure in pneumatic or hydraulic suspension bags. Additionally, electrical components may be modified to change the electrical field supplied to suspension components containing suitable fluids, like electro-rheological fluids, or even the state of tire pressure valve may be modified to vary the air pressure in associated vehicle tires. It must be understood that the electronic suspension controller 26 may modify any suitable vehicle system or subsystem as desired for improving the stability of the vehicle 10 and/or for modifying the ride or handing of the vehicle 10. Further, it must be understood that generally the actuators 28 preferably lock in the unactuated state and unlock in the actuated state. Thus, when the actuators 28 are powered (unlocked) the anti-roll bar is unenabled and when the actuators 28 are not powered (locked) the anti-roll bar is enabled.

In the illustrated embodiment, the vehicle powertrain system 20 includes an electronic transmission controller 30 and a power transmission unit 32 operatively connected to an engine 34 of the vehicle 10. The power transmission unit 32 is effective to transfer power to and distribute power among the wheels 25 of the vehicle 10. The power transmission unit 32 is operable to transfer the power from the engine 34 at a variety of different ratios to the wheels 25. For example, the power transmission unit 32 may include a conventional arrangement of gears, such as a three, four, or five speed geared transmission, with reverse capabilities. Alternatively, the power transmission unit 32 may be a continuously variable transmission (CVT), or any other mechanism operable to transmit power from the engine 34 to the wheels 25. The electronic transmission controller 30 is operable to control the power output ratio of the power transmission unit 32. For example, the electronic control unit 14 may calculate a desirable power ratio. Such a calculation may be based on a desired engine efficiency, a desired amount of torque, or any other desired result. In the illustrated embodiment, the electronic control unit 14 is operative to transmit a control signal to the electronic transmission controller 30 indicating the desired power output ratio and the electronic transmission controller 30 is operative to generate a control signal to the power transmission unit 32.

In the illustrated embodiment, the vehicle steering system 21 includes a steering controller 35 for controlling a front steering actuator 36 and a rear steering actuator 37. The front steering actuator 36 controls the angle or alignment of the front wheels 25 relative to the body or chassis of the vehicle 10 and the rear steering actuator 37 controls the angle or alignment of the rear wheels 25 relative to the body of the vehicle 10. For example, the steering controller 35 receives an input signal representative of a desired change in the angle or alignment for the wheels 25. The input signal maybe generated by a driver interface device 42, e.g. steering wheel, or by the electronic control unit 14, or by any device operable to indicate a desired change in the angle of the wheels 25. The steering controller 35 is then operative to control the angle the wheels 25. While the vehicle 10 has been described in the preferred embodiment as a vehicle having front and rear wheel steering, it must be understood that the system and method described may be utilized in conjunction with a vehicle with only front or rear wheel steering, as desired.

In the illustrated embodiment, the electronic control unit 14 is in communication with a front steering angle sensor 39 and a rear steering angle sensor 43 to receive a pair of signals representative of the steering angle or position of at least one component of the steering system, such as the front and rear wheels 25, the steering wheel 42, a pinion (not shown), a rack (not shown), shaft (not shown), gear (not shown), or any other suitable steering component. It must be understood that the electronic control unit 14 may be in direct or indirect, wired or wireless communication with the front steering angle sensor 39 and the rear steering angle sensor 43. In the illustrated embodiment, the electronic control unit 14 is preferably operative to control the plurality of vehicle control subsystems, namely ABS, SCS, TC, RC, VSC, ESC and SUSP, based at least in part upon at least one of the pair of steering angle signals received by the electronic control unit 14 from the front steering angle sensor 39 and the rear steering angle sensor 43.

In the illustrated embodiment, the vehicle control system 12 may also include a plurality of other sensors configured to detect a variety of vehicle conditions. For example, the plurality of other sensors may include a vehicle lateral acceleration sensor 40, a vehicle speed sensor 41, a vehicle yaw rate sensor (not shown), speed sensors for individual wheels (not shown), a vehicle longitudinal acceleration sensor (not shown), or any other sensor suitable to detect a desired operating condition of the vehicle 10. These sensors are all in communication with the electronic control unit 14 in order to provide signals representative of a variety of vehicle dynamics. The electronic control unit 14 is programmed to control the plurality of vehicle control subsystems, namely ABS, SCS, TC, RC, VSC, ESC and SUSP, based at least in part upon the vehicle condition data received by the electronic control unit 14 from the plurality of sensors. Further, the position of obstacles on the road and/or the position of other vehicles on the road may be detected through advanced sensors, such as, for example, a vehicular radar system 44. It may be desirable to modify control of one or more of the vehicle control subsystems controlled by the electronic control unit 14 based on a predetermined anticipated need to effect maneuvering or controlling the vehicle in order to avoid a collision with such obstacles and/or other vehicles.

In the illustrated embodiment, the front steering angle sensor 39, the rear steering angle sensor 44, the vehicle lateral acceleration sensor 40, and the vehicle speed sensor 41 are shown in FIG. 1 as preferably being in direct communication, e.g. "hard wired", with the electronic control unit 14. It must be understood, however, that the vehicle control system 12 may optionally includes one or more suitable mechanisms, e.g., a relay or a transceiver, which are operative to receive the vehicle condition data from one or more of the plurality of sensors and re-transmit the vehicle condition data to the electronic control unit 14. For example, the mechanism may be a hard-wired data relay, a wireless data transceiver, or any other suitable device for communicating the vehicle condition data from the sensors to the electronic control unit 14. Alternatively, any of the plurality of sensors and the electronic control unit 14 may connected by other suitable direct wireless communication, e.g. peer to peer, or indirect wireless communication, e.g. networked, if so desired.

Figure 2:
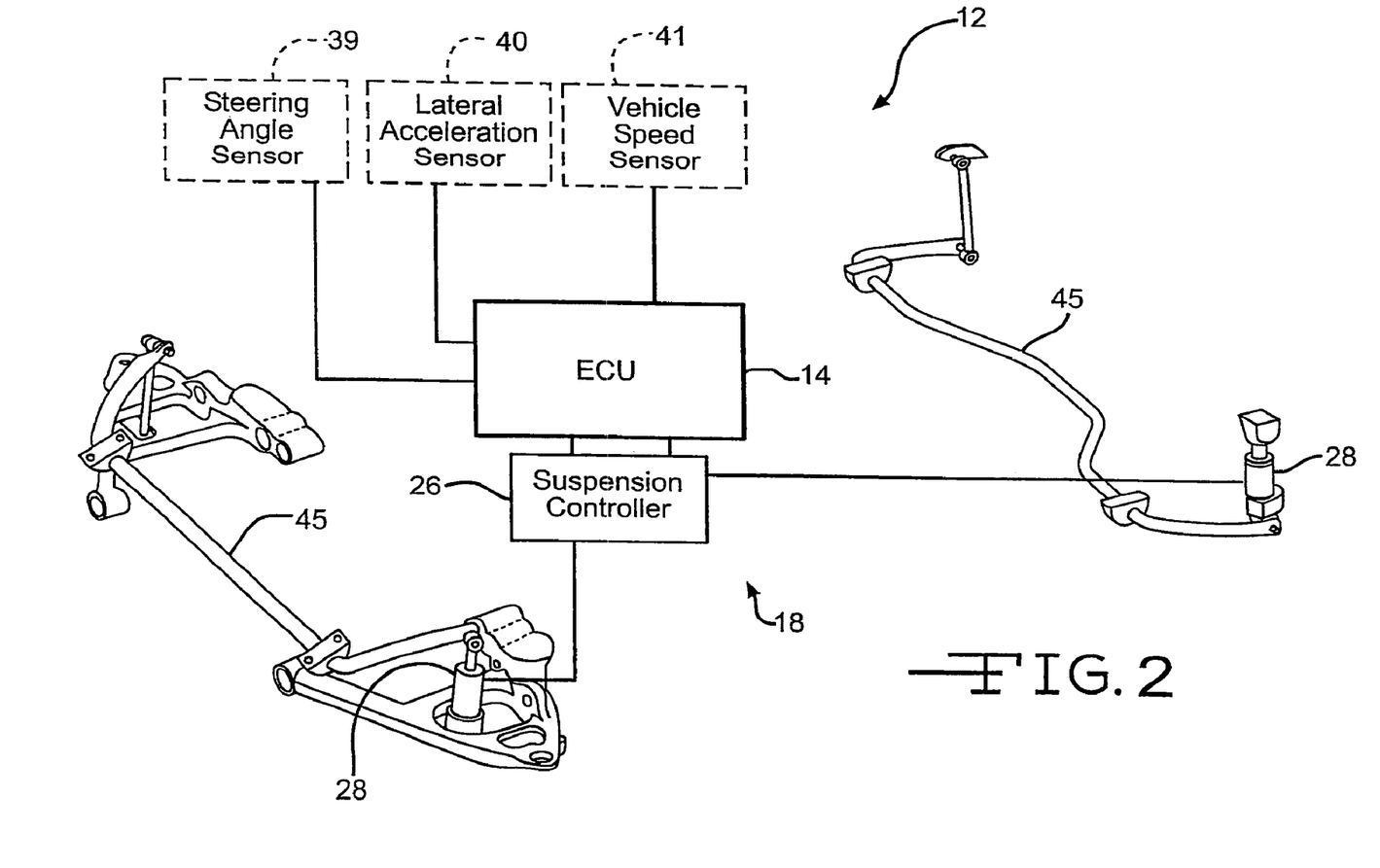
FIG. 2 is a representative illustration of a portion of the vehicle of FIG. 1.

For example, as shown in FIG. 2, an embodiment of the vehicle control system 12 will now be described with regards to a particular vehicle control subsystem, such as vehicle stability control (VSC), and will be described with regards to only a front wheel steering system and rear wheel drive system. In the following description of the front steering angle sensor 39 will be described as operative to provide a signal representative of the position of the steering wheel 42, i.e. handwheel. It must be understood, however, that this signal may be representative of the position of the front wheels 25, the front steering actuator 36, or in any other suitable component, that indicates the position of the steering system. Additionally, the signal may be representative of the position of any desired steering mechanism component. With regards to the steering position signal, in the following description the amplitude of the signal (relative deviation from a zero setting) will correlate to the displacement, e.g. angular off set, from the default, e.g. straight or forwardly aligned, position with a positive value representing change in one direction, e.g. a right and turn, and a negative value representing displacement in another direction, e.g. left hand turn. The frequency or slope of the signal will correlate to the rate of change of the steering mechanism, e.g. the steering wheel 42, i.e. handwheel. Thus, an average rate of change may be determined by analyzing the frequency of a particular signal sample and an instantaneous rate of change may be determined by analyzing the slope of a graphical representation of the signal sample at a particular point.

As shown therein FIG. 2, the front steering angle sensor 39, the vehicle lateral acceleration sensor 40, and the vehicle speed sensor 41 are operative to provide input signals to the electronic control unit 14. The electronic control unit 14 is operative to generate an output control signal based upon the input signals to the suspension controller 26. In turn, the suspension controller 26 is operative to selectively lock and unlock the suspension actuators 28. As shown, an anti-roll bar or anti-sway bar 45 is associated with each pair of the front and rear wheels 25. The suspension actuators 28 are operable to selectively lock and unlock the anti-roll bars, with one suspension actuator 28 being associated with each of the pair of wheels 25. Based upon the control signal generated by the electronic control unit 14, the suspension controller 26 selectively controls the vehicle suspension system 18 of the vehicle 10. However, it must be understood that while the electronic control unit 14 and the suspension controller 26 are illustrated as being separate components which are operatively coupled together, the electronic control unit 14 and the suspension controller 26 may be formed integrally as a single unit, or the electronic control unit 14 and the suspension controller 26 may be any one unit operable to perform the functions of the electronic control unit 14 and the suspension controller 26. Collectively, the components shown in FIG. 2 illustrate an exemplary roll control system.

Preferably, the roll control system is a semi-active roll control system, i.e. a system that only reacts to the loads applied to it. However, it must be understood that the roll control system, such as an active roll control system, i.e. a system that reacts to the applied loads positively supplied by electronically controlled hydraulic or pneumatic actuators, or the roll control system may be any other system for controlling the roll of a vehicle.

Figure 3:
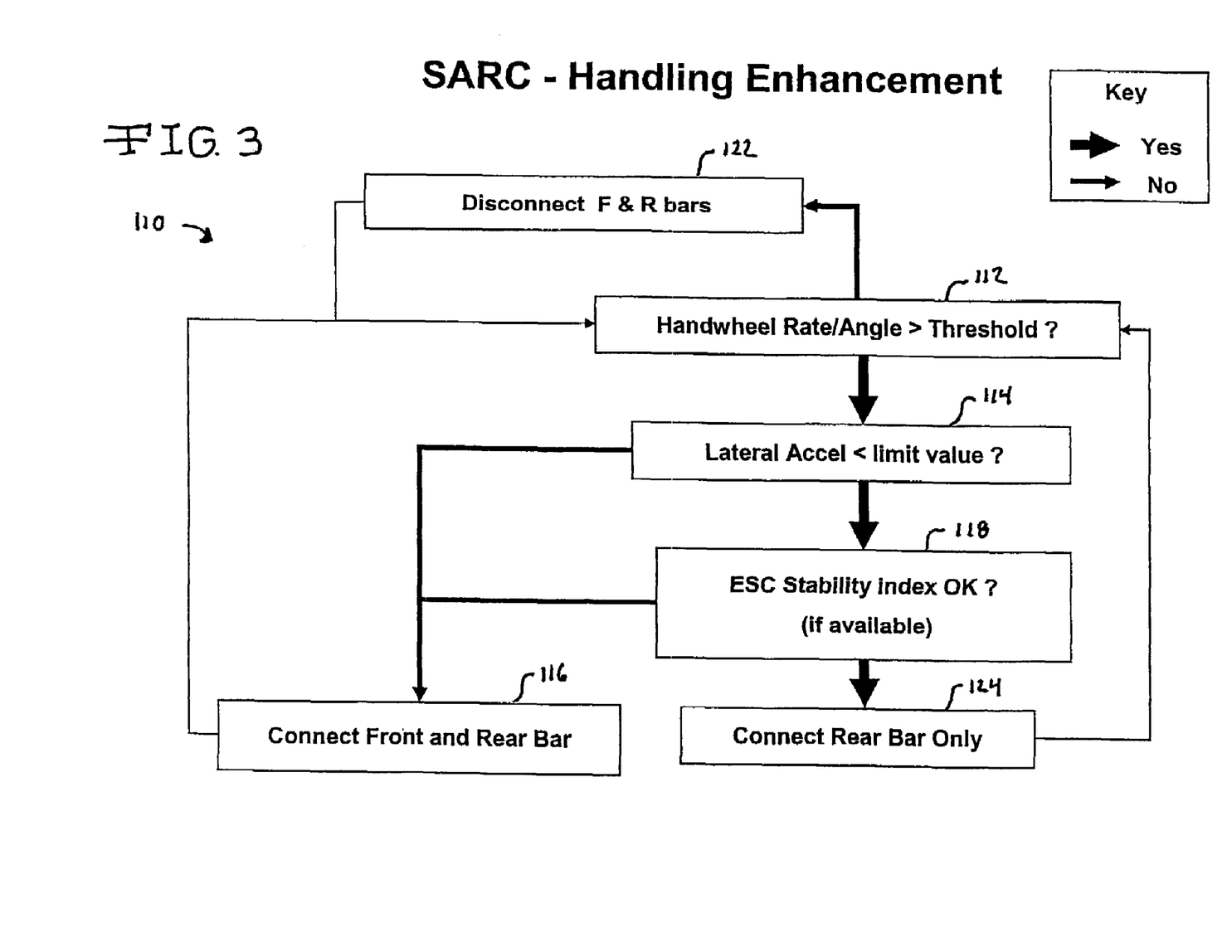
FIG. 3 is a first embodiment of a flowchart of a method of controlling a roll control system for enhancing the handling of a vehicle.

Referring now to FIG. 3, there is illustrated a first embodiment of a flowchart of a method 110 of controlling a roll control system, such as the system illustrated in FIG. 2. In this embodiment, the method 110 is for the enhancement of the handling of a vehicle. The method 110 begins in step 112 wherein a handwheel rate and/or handwheel angle is monitored and compared to a steering threshold value. For example, the handwheel rate and/or handwheel angle being monitored may be the steering angle/position signal of the front steering angle sensor 39, a signal generated by the electronic control unit 14 that is representative of the angle, position, instantaneous rate of change, or average rate of change of any desired steering mechanism component, or any other suitable signal representative of the position of any desired steering mechanism component. In the illustrated embodiment, the steering threshold is preferably an upper limit to the rate of change of the steering angle of the associated vehicle, e.g. the vehicle 10.

During step 112, if the handwheel rate and/or handwheel angle is determined to be below the steering threshold, then the method 110 proceeds to step 122 wherein the front and rear roll control devices, e.g. actuators 28 and bars 45, are unenabled, if not already unenabled, and then returns to step 112 and continues monitoring the handwheel rate and/or handwheel angle until the handwheel rate and/or handwheel angle is equal to or above the steering threshold value. If the handwheel rate and/or handwheel angle is equal to or above the steering threshold then the method 110 proceeds to step 114.

Next, in step 114 a lateral acceleration of the vehicle 10 is monitored and compared to an acceleration limit value. For example, the lateral acceleration being monitored may be the lateral acceleration signal of the vehicle lateral acceleration sensor 40, or any other suitable signal representative of the lateral acceleration of the vehicle. In the illustrated embodiment, the acceleration limit value is preferably an upper limit to the lateral acceleration the vehicle 10.

During step 114, if the lateral acceleration value is determined to be equal to or above the acceleration limit value, then the method 110 proceeds to step 116, wherein the front and rear roll control devices are enabled, if not already enabled. For example, in the embodiment of the vehicle 10, the anti-roll bars or anti-sway bars 45 associated with each pair of the front and rear wheels 25 are locked by each of the suspension actuators 28 associated with each of the pair of wheels 25 when the roll control system is in the enabled state. In this embodiment, the connection of the front and rear anti-roll bars 45 may be accomplished by the control signal generated by the electronic control unit 14 or the suspension controller 26 of the vehicle 10. Following this, the method 110 then returns to step 112 and continues through as described hereinbefore.

If during step 114 the lateral acceleration is determined to be below the acceleration limit value, then the method 110 proceeds to step 118 wherein a vehicle stability index is monitored. The vehicle stability index indicates whether or not, or to what degree, current vehicle operations may be outside of predetermined or calculated accepted stability values. For example, in the illustrated embodiment, the vehicle stability index may be based upon, alone or in combination, a yaw rate of the vehicle, wheel slip of one or more wheels of the vehicle, an oversteer/understeer of the vehicle or any other desired dynamic characteristic of the vehicle that may indicate a predetermined or calculated undesired operating state of the vehicle. Preferably, the vehicle stability indicates an oversteer when it deviates to one direction and an understeer when it deviates in the opposite direction. If during step 118, the vehicle stability index is determined to be outside of the acceptable stability values, the method 110 then proceeds to step 116 and continues through as described hereinbefore. If during step 118 the stability index is determined to be within the acceptable stability values, then the method 110 proceeds to step 124, wherein only the rear roll control device of the vehicle is enabled, if not already enabled. Following this, the method 110 then returns to step 112 and continues through as described hereinbefore.

Thus, it can be that in the illustrated embodiment of the method 110, a roll control system of the vehicle is selectively controlled by monitoring the position of a desired steering mechanism component of a vehicle. A rate of change of the position of the steering mechanism is determined. The rate of change is compared to a change threshold value. The lateral acceleration of a vehicle is monitored. The lateral acceleration is compared to an acceleration threshold value. The roll control system has front and rear actuators and the actuators are controlled at least in part upon the comparisons of the rate of change of the steering mechanism to the change threshold value and the lateral acceleration to the acceleration threshold value. The front and rear actuators are however controlled independently of each other depending upon the state of a vehicle stability index.

While for ease of description, the present example has been described as the have identical quantities or qualities used for the actuation and unactuation thresholds, values and limits. It must be understood, that in an alternative preferred embodiment, it is contemplated that the actuation and unactuation thresholds, values and limits may include a differential such that there is a range of thresholds, values and limits where there would not be a state change, thus creating a hysteresis type effect.

Figure 4:
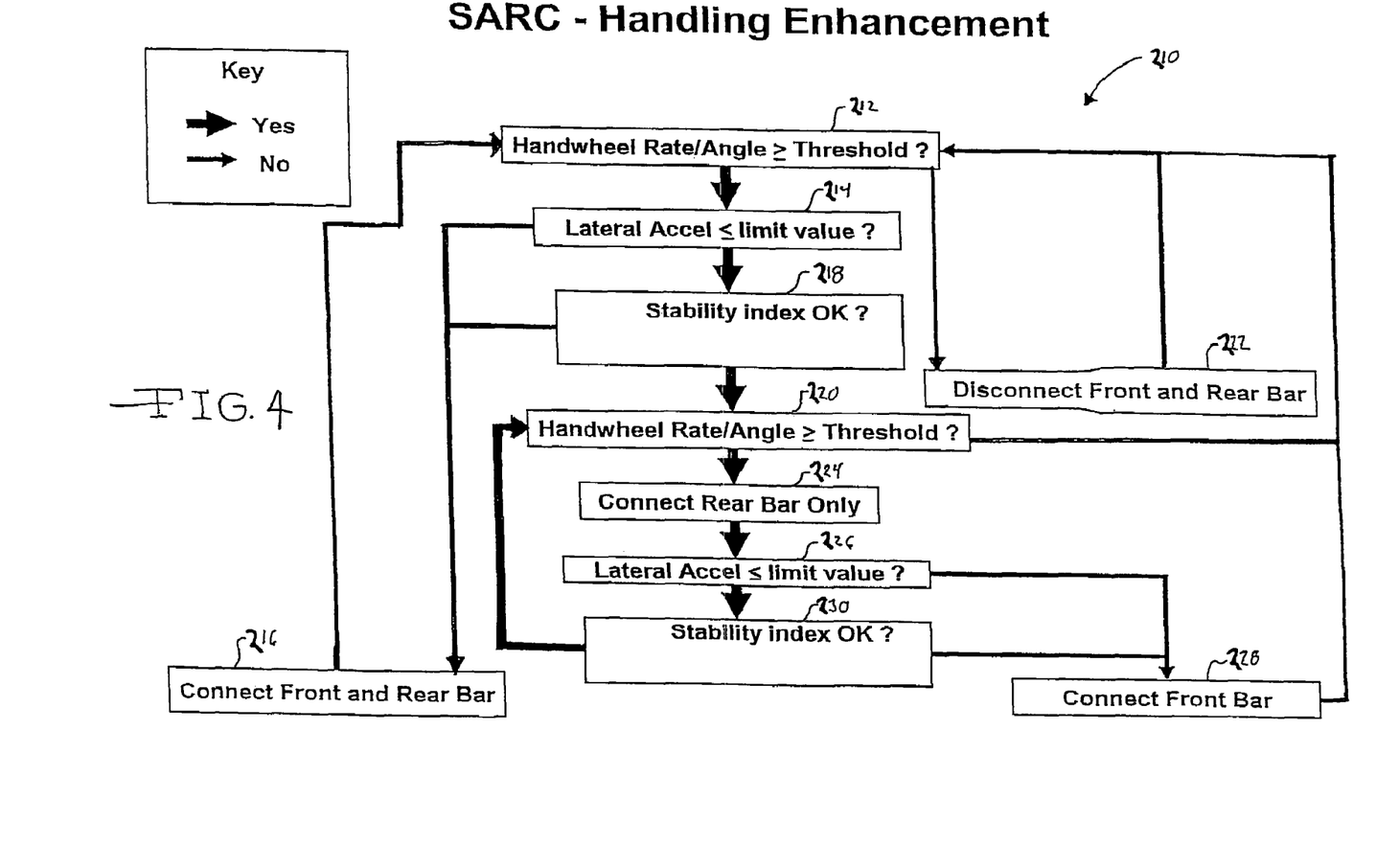
FIG. 4 is a second embodiment of a flowchart of a method of controlling a roll control system for enhancing the handling of a vehicle

Referring now to FIG. 4, there is illustrated a second embodiment of a flowchart of a method 210 of controlling a roll control system, such as the system illustrated in FIG. 2. In this embodiment, the method 210 is for the enhancement of the handling of a vehicle. The method 210 begins in step 212 wherein a handwheel rate and/or handwheel angle is monitored and compared to a first steering threshold value. For example, the handwheel rate and/or handwheel angle being monitored may be the steering angle/position signal of the front steering angle sensor 39, a signal generated by the electronic control unit 14 that is representative of the angle, position, instantaneous rate of change, or average rate of change of any desired steering mechanism component, or any other suitable signal representative of the position of any desired steering mechanism component. In the illustrated embodiment, the first steering threshold is preferably an upper limit to the rate of change of the steering angle of the associated vehicle, e.g. the vehicle 10.

During step 212, if the handwheel rate and/or handwheel angle is determined to be below the first steering threshold, then the method 210 proceeds to step 222 wherein the front and rear roll control devices, e.g. actuators 28 and bars 45, are unenabled, if not already unenabled, and then returns to step 212 and continues monitoring the handwheel rate and/or handwheel angle until the handwheel rate and/or handwheel angle is equal to or above the first steering threshold value. If the handwheel rate and/or handwheel angle is equal to or above the first steering threshold then the method 210 proceeds to step 214.

Next, in step 214 a lateral acceleration of the vehicle 10 is monitored and compared to a first acceleration limit value. For example, the lateral acceleration being monitored may be the lateral acceleration signal of the vehicle lateral acceleration sensor 40, or any other suitable signal representative of the lateral acceleration of the vehicle. In the illustrated embodiment, the first acceleration limit value is preferably an upper limit to the lateral acceleration the vehicle 10.

During step 214, if the lateral acceleration value is determined to be equal to or above the first acceleration limit value, then the method 210 proceeds to step 216, wherein the front and rear roll control devices are enabled, if not already enabled. For example, in the embodiment of the vehicle 10, the anti-roll bars or anti-sway bars 45 associated with each pair of the front and rear wheels 25 are locked by each of the suspension actuators 28 associated with each of the pair of wheels 25 when the roll control system is in the enabled state. In this embodiment, the connection of the front and rear anti-roll bars 45 may be accomplished by the control signal generated by the electronic control unit 14 or the suspension controller 26 of the vehicle 10. Following this, the method 210 then returns to step 212 and continues through as described hereinbefore.

If during step 214 the lateral acceleration is determined to be below the first acceleration limit value, then the method 210 proceeds to step 218 wherein a vehicle stability index is monitored. The vehicle stability index indicates whether or not, or to what degree, current vehicle operations may be outside of predetermined or calculated first accepted stability values. For example, in the illustrated embodiment, the vehicle stability index may be based upon, alone or in combination, a yaw rate of the vehicle, wheel slip of one or more wheels of the vehicle, an oversteer/understeer of the vehicle or any other desired dynamic characteristic of the vehicle that may indicate a predetermined or calculated undesired operating state of the vehicle. Preferably, the vehicle stability indicates an oversteer when it deviates to one direction and an understeer when it deviates in the opposite direction. If during step 218, the vehicle stability index is determined to be outside of the first acceptable stability values, the method 210 then proceeds to step 216 and continues through as described hereinbefore. If during step 218 the stability index is determined to be within the first acceptable stability values, then the method 210 proceeds to step 220.

In the illustrated embodiment, during step 220 the handwheel rate and/or handwheel angle is monitored and compared to a second steering threshold value. In the illustrated embodiment, the second steering threshold value of step 220 is preferably greater than the first steering threshold value of step 212. If during step 220 the handwheel rate and/or handwheel angle is determined to be below the second steering threshold, then the method 210 proceeds to step 212 and continues through as described herein before. If during step 220 the handwheel rate and/or handwheel angle is determined to be equal to or greater than the second steering threshold value, then the method 210 proceeds to step 224 wherein only the rear roll control device of the vehicle is enabled, if not already enabled.

Next, in the illustrated embodiment, the method 210 then proceeds to step 226 wherein the lateral acceleration of the vehicle is monitored and compared to a second acceleration limit value. In the illustrated embodiment, the second acceleration limit value of step 226 is preferably less than the first acceleration limit value of step 214. If during step 226 the lateral acceleration value is determined to be equal to or above the second acceleration limit value, then the method 210 proceeds to step 228 wherein the front roll control device of the vehicle is enabled, if not already enabled. Following this, the method 210 then returns to step 212 and continues through as described hereinbefore. If during step 226 the lateral acceleration is determined to be less than the second acceleration limit value, then the method 210 proceeds to step 230.

In the illustrated embodiment, during step 230 the state of the vehicle stability index is compared to second acceptable stability values. In the illustrated embodiment, the second acceptable stability values of step 230 are preferably more discriminating than the first acceptable stability values of step 218. For example, the stability index may be considered more discriminating if it reaches an unacceptable value with a lower yaw rate or lower slip value or is generally less tolerant of changes in the vehicle dynamics. If during step 230 the vehicle stability index is determined to be within inside of the second acceptable values, then method 210 proceeds to step 220 and continues through as described hereinbefore. If during step 230 the vehicle stability index is determined to be outside of the second acceptable stability values, then method 210 proceeds to step 228 and continues through as described hereinbefore.

Thus, it can be that in the illustrated embodiment of the method 210, a roll control system of the vehicle is selectively controlled by monitoring the position of a desired steering mechanism component of a vehicle. A rate of change of the position of the steering mechanism and/or the position or angle of the steering mechanism is determined. The rate of change is compared to a change threshold value. The lateral acceleration of a vehicle is monitored. The lateral acceleration is compared to an acceleration threshold value. The roll control system has front and rear actuators and the actuators are controlled at least in part upon the comparisons of the rate of change of the steering mechanism to the change threshold value and the lateral acceleration to the acceleration threshold value. The front and rear actuators are however controlled independently of each other depending upon the state of a vehicle stability index.

The present example has been described with first and second thresholds, values and limit, and while it is preferred that the second thresholds, values and limits be of a quantity or quality different than the first thresholds, values and limits, it is contemplated that the second thresholds, values and limits may be the same as the first thresholds, values and limits. For example, in an alternative embodiment, a time delay may be incorporated between checking first and second thresholds, values and limits in order to allow for a change in the dynamic state of the vehicle to occur.

Additionally, while for simplicities sake, the present example has been described as the have identical quantities or qualities used for the actuation and unactuation thresholds, values and limits. It must be understood, that in an alternative preferred embodiment, it is contemplated that the actuation and unactuation thresholds, values and limits may include a differential such that there is a range of thresholds, values and limits where there would not be a state change, thus creating a hysteresis type effect.

Figure 5:
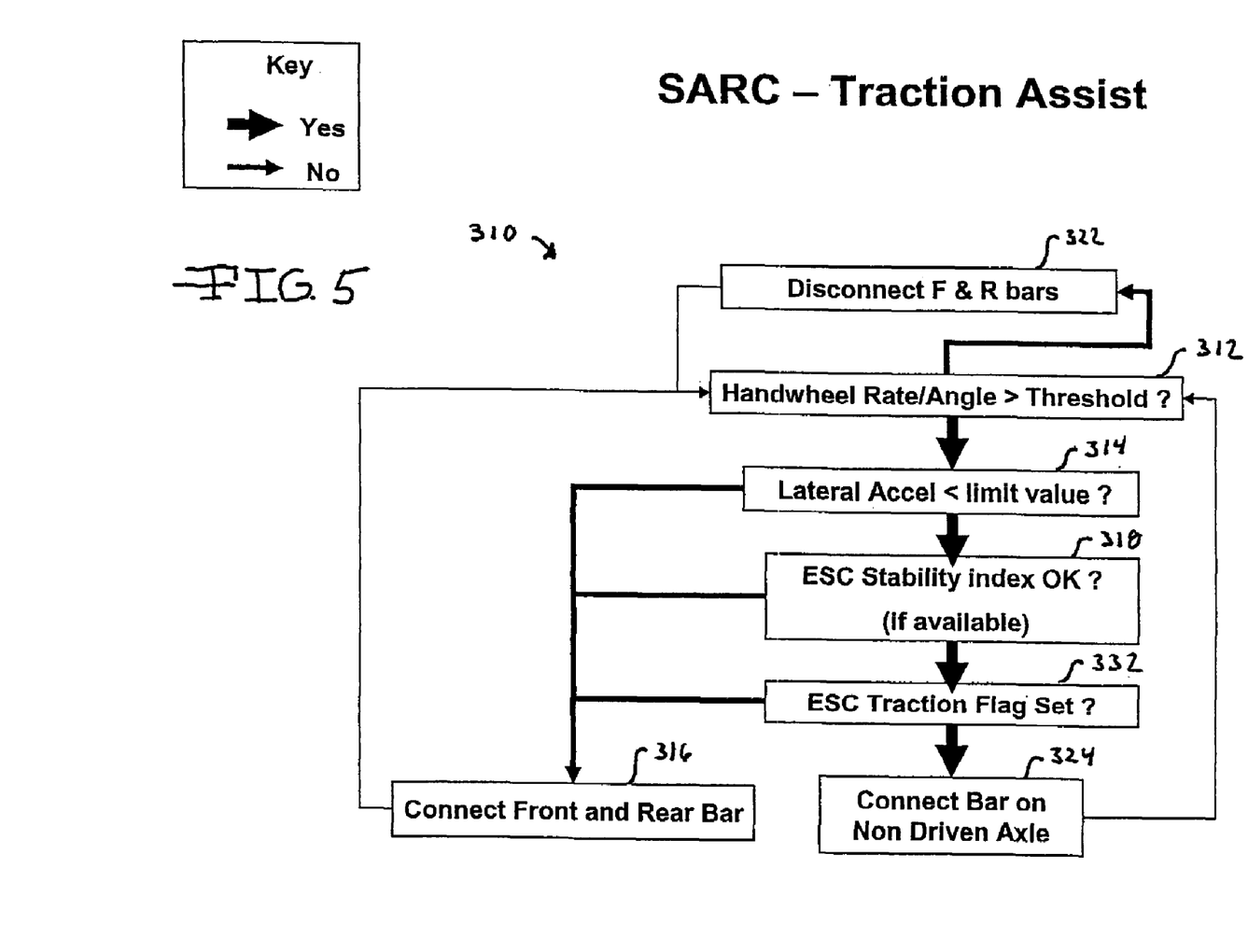
FIG. 5 is a third embodiment of a flowchart of a method of controlling a roll control system for assisting a traction control system of a vehicle.

Referring now to FIG. 5, there is illustrated a third embodiment of a flowchart of a method 310 of controlling a roll control system, such as the system illustrated in FIG. 2. In this embodiment, the method 310 is for assisting the traction control system of a vehicle.

The method 310 begins in step 312 wherein a handwheel rate and/or handwheel angle is monitored and compared to a steering threshold value. If during step 312 the handwheel rate and/or handwheel angle is determined to be below the steering threshold, then the method 310 proceeds to step 322 wherein the front and rear roll control devices, e.g. actuators 28 and bars 45, are unenabled, if not already unenabled, and then returns to step 312 and continues monitoring the handwheel rate and/or handwheel angle until the handwheel rate and/or handwheel angle is equal to or above the steering threshold value. If the handwheel rate and/or handwheel angle is equal to or above the steering threshold then the method 310 proceeds to step 314.

Next, in step 314 a lateral acceleration of the vehicle is monitored and compared to a acceleration limit value. During step 314, if the lateral acceleration value is determined to be equal to or above the acceleration limit value, then the method 310 proceeds to step 316 wherein front and rear roll control devices are enabled, if not already enabled. Following this, the method 310 then returns to step 312 and continues through as described hereinbefore.

If during step 314 the lateral acceleration is determined to be below the acceleration limit value, then the method 310 proceeds to step 318 wherein a vehicle stability index is monitored. If the stability index is determined to be outside of acceptable values then method 310 proceeds to step 316. If the stability index is determined to be within the acceptable values then method 310 proceeds to step 332.

Then, during step 332, the state of a traction flag is determined. The traction flag is to be set if low traction, or slip, conditions exist. If it is determined that the traction flag is not set then the method 310 proceeds to step 322 and proceeds through as before. If it is determined that the traction flag is set then the method 310 proceeds to step 324 wherein only the roll control device on a non-driven axle is enabled, if not enabled already. From step 324 the method 310 returns to step 312 and continues through as before.

While for simplicities sake, the present example has been described as the have identical quantities or qualities used for the actuation and unactuation thresholds, values and limits. It must be understood, that in an alternative preferred embodiment, it is contemplated that the actuation and unactuation thresholds, values and limits may include a differential such that there is a range of thresholds, values and limits where there would not be a state change, thus creating a hysteresis type effect.

Figure 6:
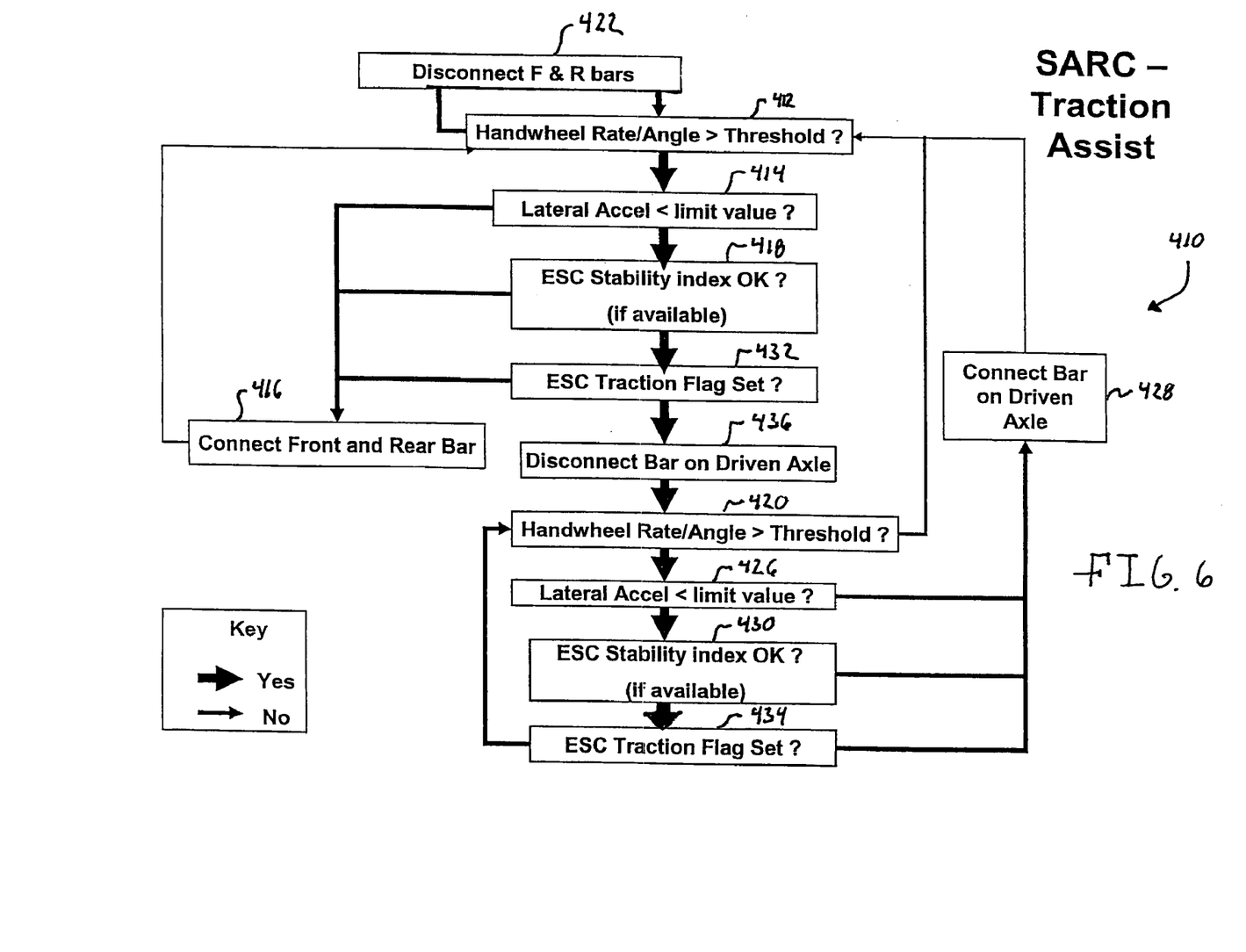
FIG. 6 is a fourth embodiment of a flowchart of a method of controlling a roll control system for assisting a traction control system of a vehicle.

Referring now to FIG. 6, there is illustrated a fourth embodiment of a flowchart of a method 410 of controlling a roll control system, such as the system illustrated in FIG. 2. In this embodiment, the method 410 is for assisting the traction control system of a vehicle.

The method 410 begins in step 412 wherein a handwheel rate and/or handwheel angle is monitored and compared to a first steering threshold value. If during step 412 the handwheel rate and/or handwheel angle is determined to be below the first steering threshold, then the method 410 proceeds to step 422 wherein the front and rear roll control devices, e.g. actuators 28 and bars 45, are unenabled, if not already unenabled, and then returns to step 412 and continues monitoring the handwheel rate and/or handwheel angle until the handwheel rate and/or handwheel angle is equal to or above the first steering threshold value. If the handwheel rate and/or handwheel angle is equal to or above the first steering threshold then the method 410 proceeds to step 414.

Next, in step 414 a lateral acceleration of the vehicle is monitored and compared to a first acceleration limit value. During step 414, if the lateral acceleration value is determined to be equal to or above the first acceleration limit value, then the method 410 proceeds to step 416 wherein control device on driven and non-driven axle are enabled, if not already enabled and then returns to step 412 and continues through as before.

If during step 414 the lateral acceleration is determined to be below the first acceleration limit value, then the method 410 proceeds to step 418 wherein a vehicle stability index is monitored. If the stability index is determined to be outside of first acceptable values then method 410 proceeds to step 416. If the stability index is determined to be within the first acceptable values then method 410 proceeds to step 432.

Then, during step 432, the state of a first traction flag is determined. The first traction flag is to be set if low traction, or slip, conditions exist. If it is determined that the first traction flag is not set then the method 410 proceeds to step 416 and proceeds through as before. If it is determined that the first traction flag is set then the method 410 proceeds to step 436 wherein the roll control device on the driven axle is disconnected if not already.

From step 436 the method 410 proceeds to step 420. In the illustrated embodiment, during step 420 the handwheel rate and/or handwheel angle is monitored and compared to a second steering threshold value, which, in the illustrated embodiment, is greater than the first steering threshold value. If the handwheel rate and/or handwheel angle is below the second steering threshold then the method 410 proceeds to step 412 and continues through as before. If the handwheel rate and/or handwheel angle is equal to or above the second steering threshold then the method 410 proceeds to step 426 wherein the lateral acceleration of the vehicle s monitored and compared to a second acceleration limit value, which is less than the first acceleration limit value.

If the lateral acceleration value is equal to or above the second acceleration limit value then the method 410 proceeds to step 428 wherein the roll control device on the driven axle is enabled, if not already enabled. The method 410 then returns to step 412 and continues through as before. If the lateral acceleration is less than the second acceleration limit value the method 410 proceeds to step 430.

During step 430 the state of the vehicle stability index is compared to second acceptable values, which, in the preferred embodiment, are more discriminating than the first acceptable values. If the stability index is determined to be outside of the second acceptable values then method 410 proceeds to step 428 and continues through as before. If the stability index is determined to be inside of the second acceptable values then method 410 proceeds to step 434.

During step 434 the state of a second traction flag is determined. The second traction flag is, in the illustrated embodiment, to be set based upon more discriminant criteria, i.e. less tolerant, than the first traction flag. If it is determined that the second traction flag is not set then the method 410 proceeds to step 428 and proceeds through as before. If it is determined that the traction flag is set then the method 410 proceeds to step 420 and proceeds through as before.

The present example has been described with first and second thresholds, values and limit, and while it is preferred that the second thresholds, values and limits be of a quantity or quality different than the first thresholds, values and limits, it is contemplated that the second thresholds, values and limits may be the same as the first thresholds, values and limits. For example, in an alternative embodiment, a time delay may be incorporated between checking first and second thresholds, values and limits in order to allow for a change in the dynamic state of the vehicle to occur.

Additionally, while for simplicities sake, the present example has been described as the have identical quantities or qualities used for the actuation and unactuation thresholds, values and limits. It must be understood, that in an alternative preferred embodiment, it is contemplated that the actuation and unactuation thresholds, values and limits may include a differential such that there is a range of thresholds, values and limits where there would not be a state change, thus creating a hysteresis type effect.

Figure 7:
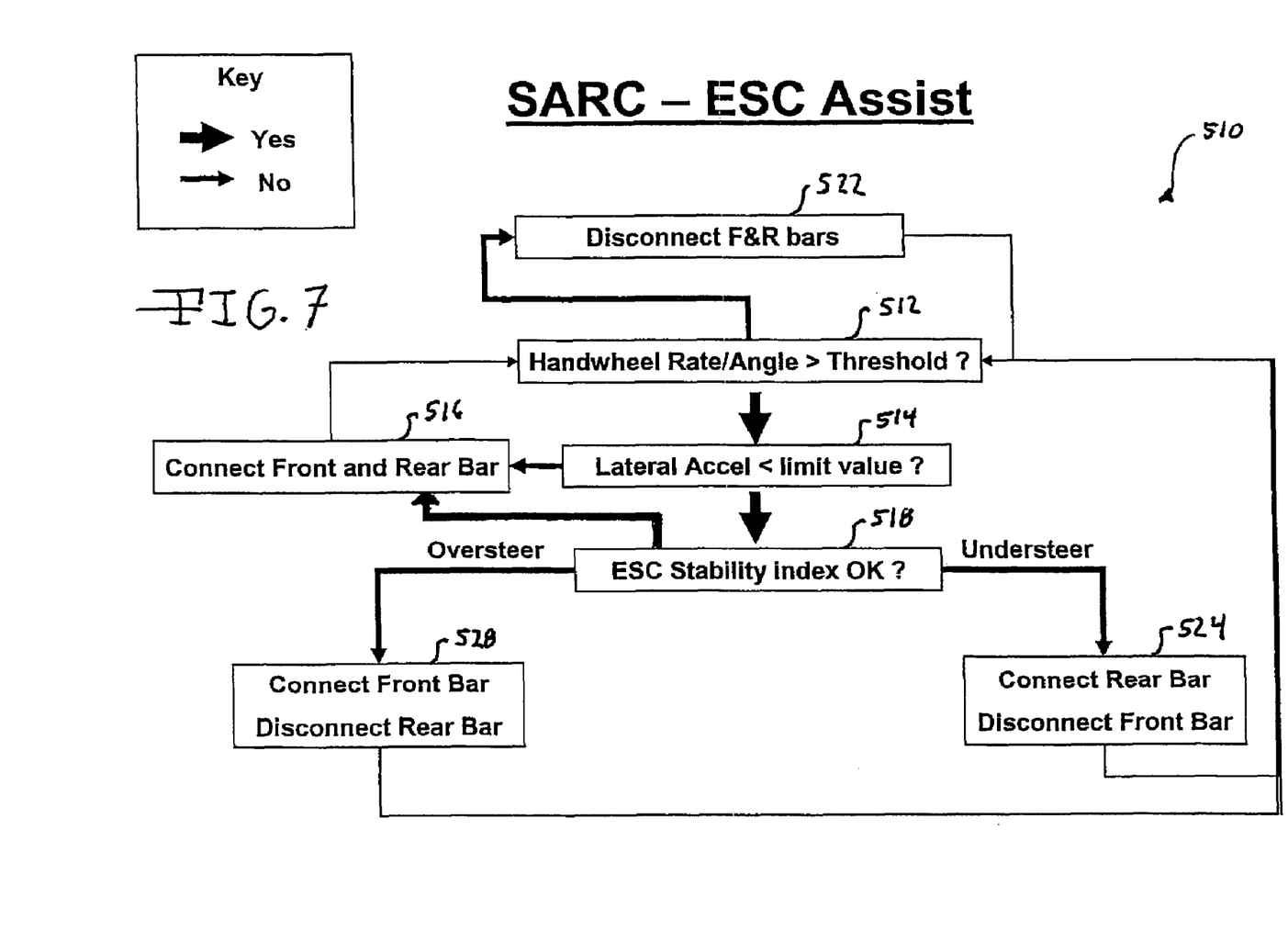
FIG. 7 is a fifth embodiment of a flowchart of a method of controlling a roll control system for assisting a slip control system of a vehicle.

There is shown in FIG. 7 a fifth embodiment of a flowchart of a method 510 of controlling a roll control system. In this embodiment the method 510 is for assisting the (enhanced) slip control system of a vehicle.

The method 510 begins in step 512 wherein a handwheel rate and/or handwheel angle is monitored and compared to a steering threshold value. If during step 512 it is determined that the handwheel rate and/or handwheel angle is below the steering threshold then the method 510 proceeds to step 522 wherein front and rear roll control devices are unenabled, if not already unenabled, and then returns to step 512 and continues monitoring the handwheel rate and/or handwheel angle until the handwheel rate and/or handwheel angle is equal to or above the steering threshold value. If during step 512 it is determined that the handwheel rate and/or handwheel angle is equal to or above the first steering threshold then the method 510 proceeds to step 514.

Next, in step 514, a lateral acceleration of the vehicle is monitored and compared to an acceleration limit value. If during step 514 it is determined that the lateral acceleration value is equal to or above the acceleration limit value then the method 510 proceeds to step 516 wherein front and rear roll control devices are enabled, if not already unenabled. The method 510 then returns to step 512 and continues through as before.

If during step 514 it is determined that the lateral acceleration is below the acceleration limit value then the method 510 proceeds to step 518 wherein a vehicle stability index is monitored. If during step 518 the stability index is determined to be inside of acceptable values, e.g. it is determined that the oversteer/understeer is within acceptable values, then method 510 proceeds to step 516 wherein front and rear roll control devices are enabled, if not already unenabled. The method 510 then returns to step 512 and continues through as before.

If during step 518 the stability index is determined to be outside of acceptable values, it is then determined if the stability index is outside of acceptable values because of an oversteer or understeer situation.

If during step 518 it is determined that there is an oversteer situation then the method 510 proceeds to step 528 wherein the front roll control device is enabled and the rear roll control device is unenabled, if not already unenabled. The method 510 then returns to step 512 and continues through as before.

If during step 518 it is determined that there is an understeer situation then the method 510 proceeds to step 524 wherein the rear roll control device is enabled and the front roll control device is unenabled, if not already unenabled. The method 510 then returns to step 512 and continues through as before.

Thus, in several aspects, a method is provided where vehicle dynamic control is enabled at high turn rates, high lateral accelerations, and or at high stability indices while limiting the intrusion to the driver by activating roll control components independently. For example, front and rear stabilizer bars may be connected simultaneously, at the same time, or independently, at different times. Examples of such a control strategy includes connecting the rear bar before the front to promote faster vehicle steering response, disconnecting the bar on the driven axle to increase traction, and disconnecting one of the front or rear bars as appropriate to address understeer or oversteer during cornering.

While the principles and modes of operation of this invention have been explained and illustrated with regards to particular embodiments, it must be understood, however, that this invention may be practiced otherwise than as specifically explained and illustrated without departing from its spirit or scope.

What is claimed is:

1. A method of controlling a vehicle roll control system comprising the steps of:

(a) monitoring the position of a steering mechanism of a vehicle;

(b) determining a rate of change of the position of the steering mechanism;

(c) comparing the rate of change of the position of the steering mechanism to a first steering threshold value;

(d) monitoring the lateral acceleration of a vehicle;

(e) comparing the lateral acceleration to a first acceleration limit value;

(f) monitoring a vehicle stability index; and (g) controlling a vehicle roll control system having front and rear actuators based at least in part upon the comparisons of the rate of change to the first steering threshold value and the lateral acceleration to the first acceleration limit value, wherein the front and rear actuators are controlled independently of each other based upon a state of understeer/oversteer of the vehicle stability index.

2. The method of claim 1 wherein the controlling during step (g) includes actuating a roll control device on a non driven axle independently of actuating a roll control device on a driven axle.

3. The method of claim 1 wherein the controlling during step (g) includes actuating a roll control device on a driven axle under higher threshold values than a roll control device on a non-driven axle.

4. The method of claim 1 wherein the state of the vehicle stability index during step (g) is based at least in part upon one of a yaw rate of the vehicle, wheel slip of one or more wheels of the vehicle, and the oversteer/understeer situation of the vehicle.

5. A method of controlling a vehicle roll control system comprising the steps of:

(a) monitoring the position of a steering mechanism of a vehicle;

(b) determining a rate of change of the position of the steering mechanism;

(c) comparing the rate of change of the position of the steering mechanism to a first steering threshold value;

(d) monitoring the lateral acceleration of a vehicle;

(e) comparing the lateral acceleration to a first acceleration limit value;

(f) monitoring a vehicle stability index; and (g) controlling a vehicle roll control system having front and rear actuators based at least in part upon the comparisons of the rate of change to the first steering threshold value and the lateral acceleration to the first acceleration limit value, wherein the front and rear actuators are controlled independently of each other based upon a state of understeer/oversteer of the vehicle stability index;

wherein the controlling during step (g) includes actuating a roll control device associated with a front pair of wheels in an oversteer situation.

6. A method of controlling a vehicle roll control system comprising the steps of:

(a) monitoring the position of a steering mechanism of a vehicle;

(b) determining a rate of change of the position of the steering mechanism;

(c) comparing the rate of change of the position of the steering mechanism to a first steering threshold value;

(d) monitoring the lateral acceleration of a vehicle;

(e) comparing the lateral acceleration to a first acceleration limit value;

(f) monitoring a vehicle stability index; and (g) controlling a vehicle roll control system having front and rear actuators based at least in part upon the comparisons of the rate of change to the first steering threshold value and the lateral acceleration to the first acceleration limit value, wherein the front and rear actuators are controlled independently of each other based upon a state of understeer/oversteer of the vehicle stability index;

wherein the controlling during step (g) includes actuating a roll control device associated with a rear pair of wheels in an understeer situation.

7. A method of controlling a vehicle roll control system comprising the steps of:

(a) monitoring the position of a steering mechanism of a vehicle;

(b) determining a rate of change of the position of the steering mechanism;

(c) comparing the rate of change of the position of the steering mechanism to a first steering threshold value;

(d) monitoring the lateral acceleration of a vehicle;

(e) comparing the lateral acceleration to a first acceleration limit value;

(f) monitoring a vehicle stability index; and (g) controlling a vehicle roll control system having front and rear actuators based at least in part upon the comparisons of the rate of change to the first steering threshold value and the lateral acceleration to the first acceleration limit value, wherein the front and rear actuators are controlled independently of each other depending upon the state of the vehicle stability index;

wherein controlling during step (g) includes setting a traction flag and actuating a roll control device associated with a pair of wheels on a non driven axle in response to the set traction flag.

8. A method of controlling a vehicle roll control system comprising the steps of:

(a) monitoring the position of a steering mechanism of a vehicle;

(b) comparing the position of the steering mechanism to a first steering threshold value;

(c) monitoring the lateral acceleration of a vehicle;

(d) comparing the lateral acceleration to a first acceleration limit value;

(e) monitoring a vehicle stability index; and (f) controlling a vehicle roll control system having front and rear roll control devices based at least in part upon the comparisons of the steering mechanism position to the first steering threshold value and the vehicle lateral acceleration to the first acceleration limit value, wherein the front and rear roll control devices are enabled independently of each other and based upon a state of understeer/oversteer of the vehicle stability index;

wherein the controlling during step (f) includes actuating the rear roll control device and unactuating the front roll control device upon detecting a state of understeer.

9. A method of controlling a vehicle roll control system comprising the steps of:

(a) monitoring the position of a steering mechanism of a vehicle;

(b) comparing the position of the steering mechanism to a first steering threshold value;

(c) monitoring the lateral acceleration of a vehicle;

(d) comparing the lateral acceleration to a first acceleration limit value;

(e) monitoring a vehicle stability index; and (f) controlling a vehicle roll control system having front and rear roll control devices based at least in part upon the comparisons of the steering mechanism position to the first steering threshold value and the vehicle lateral acceleration to the first acceleration limit value, wherein the front and rear roll control devices are enabled independently of each other and based upon a state of understeer/oversteer of the vehicle stability index;

wherein the controlling during step (f) includes actuating the front roll control devices and unactuating the rear roll control device upon detecting a state of oversteer.

10. A method of controlling a vehicle roll control system comprising the steps of:
  (a) monitoring the position of a steering mechanism of a vehicle;
  (b) comparing the position of the steering mechanism to a first steering threshold value;
  (c) monitoring the lateral acceleration of a vehicle;
  (d) comparing the lateral acceleration to a first acceleration limit value;
  (e) monitoring a vehicle stability index; and
  (f) controlling a vehicle roll control system having front and rear roll control devices based at least in part upon the comparisons of the steering mechanism position to the first steering threshold value and the vehicle lateral acceleration to the first acceleration limit value, wherein the front and rear roll control devices are enabled independently of each other and depending upon the state of the vehicle stability index;
  further comprising the steps, before step (f) of:
  (g) comparing the position of the steering mechanism to a second steering threshold value; and
  wherein the controlling during step (f) includes actuating only the rear roll control device upon determining that the position of the steering mechanism is between the first steering threshold value and the second steering threshold value.

11. The method of claim 10 further comprising the steps, before step (f) of:
  (h) comparing the lateral acceleration to a second acceleration limit value; and wherein the controlling during step (f) includes actuating the front roll control device upon determining that the vehicle lateral acceleration is between the first acceleration limit value and the second acceleration limit value.

12. A method of controlling a vehicle roll control system comprising the steps of:
  (a) monitoring the position of a steering mechanism of a vehicle;
  (b) comparing the position of the steering mechanism to a first steering threshold value;
  (c) monitoring the lateral acceleration of a vehicle;
  (d) comparing the lateral acceleration to a first acceleration limit value;
  (e) monitoring a vehicle stability index; and
  (f) controlling a vehicle roll control system having front and rear roll control devices based at least in part upon the comparisons of the steering mechanism position to the first steering threshold value and the vehicle lateral acceleration to the first acceleration limit value, wherein the front and rear roll control devices are enabled independently of each other and depending upon the state of the vehicle stability index;
  wherein the controlling during step (f) includes actuating only the roll control device on a non driven axle upon determining that the position of the steering mechanism is greater than the first steering threshold value and that the vehicle lateral acceleration is greater than the acceleration limit value.

13. The method of claim 12 further comprising the steps, before step (f) of:
  (g) comparing the lateral acceleration to a second acceleration limit value; and wherein the controlling during step (f) includes actuating the control device on a driven axle upon determining that the position of the steering mechanism is between the first steering threshold value and a second steering threshold value and that the vehicle lateral acceleration is between the first acceleration limit value and the second acceleration limit value.

14. A method of controlling a vehicle roll control system comprising the steps of:
  (a) monitoring one of the position of a steering mechanism of a vehicle and a rate of change of the position of the steering mechanism;
  (b) comparing the one of the position and the rate of change of the position of the steering mechanism to a first steering threshold value;
  (c) monitoring the lateral acceleration of a vehicle;
  (d) comparing the lateral acceleration to a first acceleration limit value;
  (e) monitoring a vehicle stability index; and
  (f) controlling a vehicle roll control system having at least one of front and rear roll control devices based at least in part upon the comparisons of the steering mechanism position to the first steering threshold value and the vehicle lateral acceleration to the first acceleration limit value, wherein the one of the front and rear roll control devices is enabled based at least in part upon an oversteer/understeer state of the vehicle stability index.

* * * * *